United States Patent
Norpoth

(10) Patent No.: US 11,731,839 B2
(45) Date of Patent: Aug. 22, 2023

(54) MEASURING A CHAIN FORCE ON CHAIN CONVEYORS

(71) Applicant: THIELE GMBH & CO. KG, Iserlohn (DE)

(72) Inventor: Bernhard Norpoth, Essen (DE)

(73) Assignee: THIELE GMBH & CO. KG, Iserlohn (DE)

( * ) Notice: Subject to any disclaimer, the term of this patent is extended or adjusted under 35 U.S.C. 154(b) by 0 days.

(21) Appl. No.: 17/620,475

(22) PCT Filed: May 26, 2020

(86) PCT No.: PCT/DE2020/100446
§ 371 (c)(1),
(2) Date: Dec. 17, 2021

(87) PCT Pub. No.: WO2020/253905
PCT Pub. Date: Dec. 24, 2020

(65) Prior Publication Data
US 2022/0258983 A1 Aug. 18, 2022

(30) Foreign Application Priority Data
Jun. 18, 2019 (DE) .................... 10 2019 116 534.2

(51) Int. Cl.
*B65G 23/44* (2006.01)
*B65G 43/02* (2006.01)

(52) U.S. Cl.
CPC ............. *B65G 23/44* (2013.01); *B65G 43/02* (2013.01)

(58) Field of Classification Search
CPC ................. B65G 23/44; B65G 43/02
USPC .......................................... 198/813, 810.04
See application file for complete search history.

(56) References Cited

U.S. PATENT DOCUMENTS

| | | | | |
|---|---|---|---|---|
| 4,566,339 A | * | 1/1986 | Davidson ................. | G01L 5/047 73/773 |
| 8,191,703 B2 | * | 6/2012 | Tokhtuev ................ | B65G 43/02 198/810.04 |
| 8,387,777 B2 | * | 3/2013 | Tokhtuev ................ | B65G 43/02 198/810.04 |
| 8,985,423 B2 | | 3/2015 | Ehrmann et al. | |
| 10,145,770 B2 | * | 12/2018 | Frost ....................... | B65G 43/02 |

(Continued)

FOREIGN PATENT DOCUMENTS

CN 109625791 A 4/2019
DE 102012112947 B3 11/2013

(Continued)

OTHER PUBLICATIONS

Office Action for German Application No. 102019116534.2 dated Jan. 30, 2020; 17pp.

(Continued)

*Primary Examiner* — James R Bidwell
(74) *Attorney, Agent, or Firm* — Hauptman Ham, LLP

(57) ABSTRACT

A method for pre-tensioning a chain conveyor, the method relating to a chain strand which is deflected by at least one chain wheel, wherein at least one measurement module is integrated in the chain strand and transmits data wirelessly to a communication device arranged outside the chain strand. The pre-tensioning force is adjusted according to the data collected and transmitted wirelessly by the measurement module.

15 Claims, 2 Drawing Sheets

(56) References Cited

U.S. PATENT DOCUMENTS

| | | | |
|---|---|---|---|
| 10,422,709 B2* | 9/2019 | Zhu | G01L 5/047 |
| 2007/0245837 A1* | 10/2007 | Scott | G01L 5/101 |
| | | | 73/862.627 |
| 2008/0214344 A1* | 9/2008 | Lodge | G01L 5/102 |
| | | | 702/42 |
| 2011/0132724 A1 | 6/2011 | Buchkremer | |
| 2013/0068594 A1 | 3/2013 | Worthington et al. | |
| 2015/0275664 A1 | 10/2015 | Klabisch et al. | |
| 2015/0330846 A1 | 11/2015 | Norpoth | |
| 2016/0304286 A1 | 10/2016 | Pauli et al. | |
| 2017/0006878 A1 | 1/2017 | Domenicucci et al. | |

FOREIGN PATENT DOCUMENTS

| | | |
|---|---|---|
| DE | 112013005479 T5 | 8/2015 |
| DE | 202015104101 U1 | 8/2015 |
| EP | 2881720 A1 | 6/2015 |
| EP | 3539906 A1 | 9/2019 |
| WO | 2007012796 A1 | 2/2007 |
| WO | 2010049082 A1 | 5/2010 |
| WO | 2018169920 A1 | 9/2018 |

OTHER PUBLICATIONS

International Search Report and Written Opinion of International Application No. PCT/DE2020/100446 dated Oct. 2020; 21pp.
Office Action for Russian Application No. 2022100610 dated Aug. 22, 2022; 10pp.
Office Action for Chinese Application No. 202080041421.2 dated Feb. 11, 2023; 17pp.

\* cited by examiner

MEASURING A CHAIN FORCE ON CHAIN CONVEYORS

RELATED APPLICATION(S)

The present application is a National Phase of International Application Number PCT/DE2020/100446 filed May 26, 2020, and claims priority of German Application Number 10 2019 116 534.2, filed Jun. 18, 2019.

FIELD

The present disclosure relates to a method for pre-tensioning a chain conveyor having at least one chain wheel.

BACKGROUND

Chain conveyors have at least one chain wheel at each end. The chain wheels are also called deflection wheels. The chain runs between the chain wheels. Entrainment means such as scrapers or similar are attached to the chain itself in order to move a product to be transported along the conveyor line. Such chain conveyors are used in mining technology, among other sectors. However, they are able to be used for conveying bulk material or other materials above ground or in other areas of application.

In this case, the pre-tensioning force of such a system is important for efficient operation and for reducing the wear that occurs during circulation and also travel in the conveyor line. After an initial installation, various interfering factors occur during operation. For example, abrasive wear and also a divisional elongation of the chain is able to occur. Also, thermal expansion and/or the respective intake capacity of the goods to be transported is able to require different pre-tensioning forces of the chain strand of a chain conveyor.

The continuous measurement of the chain forces together with wireless transmission for using this data to enable a continuous control loop for the pre-tensioning force of the tensioning system seems technically possible in theory. In practice, however, significant constraints exist, which are caused, for example, by the short range of wireless transmission. Also, with regard to the duration of use, only a small battery capacity is possible in active measurement modules and wireless transmission modules.

For example, DE 10 2012 112 947 B3 discloses a chain link in which a strain gauge is used.

Document DE 11 2013 005 479 C5 discloses a chain conveyor in which the tractive force in the chain strand is adjusted with the aid of a control system.

SUMMARY

The object of the present disclosure is to specify a means of efficiently adjusting the pre-tensioning force of a chain conveyor according to the occurring load and/or the prevailing operating conditions.

The above-mentioned object is achieved according to the disclosure with a method for pre-tensioning a chain conveyor.

The method for pre-tensioning a chain conveyor provides that the chain conveyor comprises at least one chain strand which is deflected via at least one chain wheel. The chain strand is deflected via two chain wheels arranged at opposite ends. At least one measurement module is integrated in the chain strand. The measurement module is able to measure the chain force, such as the pre-tensioning force, for example via a strain gauge, and transmit the data wirelessly as a signal to a communication unit arranged outside the chain strand. The communication unit is able to be mobile, but is also able to be stationary. The pre-tensioning force of the chain strand is then adjusted according to the data collected and transmitted wirelessly by the measurement module.

The method is able to be executed on a chain conveyor which is designed with two or more chain strands, for example.

The method according to the disclosure is able to be used to retrofit already installed chain conveyors, but also to equip chain conveyors to be newly installed. A three-link chain strand is arranged in the chain strand. In addition, a central chain link is able to comprise a measurement module. This has a central crosspiece in which the measurement module, a strain gauge with an energy storage unit and a wireless transmission module, is inserted. The measurement module is then encapsulated or sealed against external influences, such as contamination or weather effects, by means of a potting resin. In order that the three-link chain strand is able to be arranged with the measurement module in the chain strand, two outer chain links are implemented in the form of a chain lock or chain block lock, with which the chain link and measurement module is able to be integrated into the chain strand.

The structure of the chain link which is equipped with the measurement module is designed in such a way that an energy storage unit in the form of a battery is able to be replaced. For this purpose, for example, the potting resin is able to be partially opened, the battery exchanged and the opening closed again using a potting resin. Within the context of the disclosure, a reversible seal is able to be used, for example, made of rubber material, such as a sealed cover.

The wireless transmission of the measurement module is able to take place via radio, for example, but also via WLAN, Bluetooth, or other wireless transmission options. The measurement device therefore also comprises a wireless transmission module and an energy storage unit, for example, a battery.

In order for the data recorded by the measurement module to be received and evaluated, a stationary communication unit and/or a mobile communication unit is provided. The stationary communication unit is able to be used as an alternative or in addition to the mobile communication unit.

The stationary communication unit is located in the region of the reversal point of the chain strand, hence in the region of a chain wheel. This means that at least one receiver module of the stationary communication unit is arranged in the region of the reversal point, i.e. the chain wheel. This means periodic or even continuous measurements are able to be performed.

Periodic measurements are able to be performed in such a way that a measurement module measures current data as the measurement module passes through the chain wheel and forwards the data to the communication unit. A plurality of communication units are able to be arranged in a stationary manner, each of which is able to communicate with the measurement module independently, but is also able to exchange or transfer the data among one another.

Additional computer devices and recording systems are able to be connected to the communication unit itself. The measured values of the chain strand are able to be received. In addition, these values are able to be recorded in the course of an inspection or quality assurance. Additional computer devices and recording systems are also able to be connected to a control or monitoring center.

The communication unit is able to be connected to a pre-tensioning device, or to an open-loop or closed-loop control system of the pre-tensioning device, so that a control loop with manual intervention or else a closed control loop for continuous adjustment of the pre-tensioning force is implemented.

Alternatively and in addition, a mobile communication unit is able to be provided, which is designed as a hand-held device, for example, in the form of a PDA or else a smartphone or tablet. The mobile communication unit also comprises a receiver unit which is able to communicate with a measurement module.

If the operation of the chain conveyor is interrupted, the mobile communication unit is able to be placed near to the measurement module and thus exchange data. This could also take place during the operation of the chain conveyor, for example, the mobile communication unit is carried along in a transmitter space of the measurement module to receive recorded and transmitted data therefrom. The mobile communication unit is able to activate the measurement module and thus also act as a transmitter and, for example, perform spot-check measurements as part of the quality and/or wear control. In turn, the mobile communication unit is able to communicate with an open-loop or closed-loop control system of the pre-tensioning device.

Each of the above-mentioned communication units comprises a housing with integrated control and evaluation electronics, at least one receiver device, for example an antenna, a power supply, for example, a battery. The communication unit is able to have a display and/or input keys. The respective communication unit is able to send signals to the measurement module, for example activation signals.

The measurement modules themselves comprise a measurement unit, at least one strain gauge and a wireless transmission unit and, in the case of an active measurement module, an energy storage unit, for example, a battery. The measurement modules are able to be transferred not only to a stand-by function but also a deep sleep function. Each measurement module is able to be activated via wireless communication, for example by radio. According to the disclosure, this allows for the energy storage unit to be used over a longer deployment period, for example several months or years. The measured values are able to be provided as data and transmitted wirelessly, for example, via a signal. The terms data, measured values and signals are to be used interchangeably within the context of the disclosure in the sense that values are measured, converted into data and the data are transmitted via signals, the signals then being evaluated to form data.

The actual measurements and thus the adjustment or control process for the pre-tensioning force is able to be carried out as follows.

This is able to be carried out periodically or continuously, but also oriented to demand. In addition, each of the above-described measurement methods is able to be carried out separately.

In the case of on-demand measurement, a measurement is able to be performed, for example, at specified operating times, maintenance intervals, for example, visual assessment of suspected wear. For this purpose, the chain conveyor is able to be stopped and a corresponding on-demand mode, for example mode 1, is able to be selected using the mobile communication unit. Various parameters can then be set in the communication unit, such as the measurement frequency, measurement duration, or similar. The at least one measurement module is activated from a deep sleep mode by the communication unit. For example, the chain conveyor is able to be put into operation and the measurement performed for a specified period of time. For this purpose there are again two alternative or complementary options. On the one hand, the measured values can be recorded by the measurement module and transferred to the communication unit after the measurement process has been completed. However, the measured values can also be continuously transmitted to the communication unit during operation, in real time. In the first case, the chain conveyor is then stopped and the measured values are read out, stored, and processed by means of the mobile communication unit. In a real-time transmission, the measured values would be transmitted to the communication unit. This is dependent on the range.

Important measured values can be, for example, the minimum, maximum or also mean values of the forces occurring. For example, the frequency distribution of defined force ranges, for example, 20, 40, 60, and 80 percent of the maximum value, can also be displayed immediately.

The measured values can then be time-stamped and stored or made available for archiving and further evaluation. The mobile communication unit is able to forward the measured values. The mobile communication unit is able to be used in a charging and coupling station, for example, and the measured values can then be forwarded accordingly.

A further option is a periodic measurement. This is used for adjusting the pre-tensioning force, and is able to be performed for every circuit of the chain strand, but also for every second or third circuit, for example. For this purpose, the measurement module is set to a controlled mode, which is called mode 2, for example. For example, this activation and adjustment of the measurement module is able to be carried out via the mobile communication unit. If a plurality of measurement modules are used in a chain strand, a plurality of measurements can also be carried out per circuit.

A first transmitter/receiver unit, for example, a first antenna, is able to be located directly behind a chain wheel in the circulation direction. This transmitter/receiver unit emits a signal that wakes the measurement module from the deep sleep mode as the measurement model over. The measurement module then records measured values, optionally including time stamps, for a period which is less than 2 seconds, less than 1.5 seconds and for example 1 second long, at a low frequency of e.g. 10 to 100 Hertz, or 20 Hertz, and then sends the recorded measured values as data to a stationary communication unit or a receiver unit connected thereto. Due to the period of time that has elapsed, the measurement module automatically returns to the deep sleep mode. This reduces energy consumption, such as current consumption, to a minimum, and the corresponding operation is possible even over several weeks or months of use. The stationary communication unit then immediately carries out a plausibility check of the measured values and processes them, for example, forming a mean value. A force value that is developed for each complete circuit of the chain strand is able to be determined. The pre-tensioning force of the chain strand via a pre-tensioning device is able to be controlled. The values processed by the stationary communication unit is able to directly control the pre-tensioning device as part of a control circuit. In the latter case, the chain strand is continuously under an optimum pre-tension taking into account external effects and/or wear, so that the efficiency with which the chain strand is operated is high.

The frequency mentioned above refers to a measurement frequency or sampling rate. It indicates the number of measurements implemented in a specified time interval. For the purposes of this disclosure, a low-frequency measurement frequency would be a range of, for example, 10 to 100

Hertz, a high-frequency measurement in a range of 100 to 1000 Hertz. The time intervals at which the measurement is performed are 1 to 10 seconds, or 3 to 6 seconds. Surprisingly, experimentation has shown that using a measurement frequency of 20 Hertz, for example, ensures that tension peaks that occur in the chain conveyor are reliably detected. In a measurement period of 3 seconds, for example, there will be 60 measured values.

The measured values are referred to in the context of this disclosure as raw data. If a higher-frequency measurement is then carried out, a large number of raw data samples is available. For example, if the measurements are made at a frequency of 1000 Hertz over a period of 3 seconds, 3000 readings would be obtained. This represents a correspondingly high volume of data that would then need to be transmitted wirelessly. However, this suffers from two disadvantages. On the one hand, an appropriate transmission time of the measurement device must be provided in order to transmit the collected data wirelessly to the communication device. Since the chain conveyor is able to be moved during this transmission period, the range of the wireless transmission must also be increased at the same time. Both points have a negative effect on the energy available and lead to a more rapid battery drain.

For this reason, the disclosure also provides that when forwarding raw data, the frequency is within a range from to 50 Hertz. Alternatively or in addition, the measurement module is able to be equipped in such a way that the raw data is conditioned in the measurement module. For example, an evaluation of minimum and maximum values can be carried out. An average value is calculated. The amount of raw data is able to be significantly reduced, so that, for example, only 10 to 50 data points are transferred. A plausibility check is able to be carried out beforehand, which is able to be implemented, for example, via a corresponding filter, for example, a low-pass filter, so that measured values that appear illogical or lie outside the expected measurement ranges would be directly filtered out. If the raw data is conditioned in this way, then according to the disclosure only a small portion of processed data are able to be sent via the measurement device and received by the communication device. This allows a reduction in the volume of data to be sent so that the transmission period is shorter and the transmission time required for the transmission is also reduced, which means that the transmission power or transmission range is able to be reduced at the same time. This saves energy from the battery so that the measurement device can remain in the chain for longer without replacing the battery.

In addition, a repeater is used for receiving and forwarding the data sent by the measurement device. A repeater is able to be installed locally nearer to the chain strand, especially for underground mining. The transmission power of the measurement device is able to be reduced in turn since it only has to transmit the data as far as the repeater. The data is able to be forwarded from the repeater to a communication device or, for example, also to a second antenna. The data transmitted wirelessly by the repeater or the transmission direction of the repeater is able to be directed selectively in one direction. Thus, a higher range is able to be ensured. At the same time, the transmission power of the repeater is able to be used, which itself is also not wired and used with an independent battery supply.

BRIEF DESCRIPTION OF THE DRAWINGS

Further embodiments, features, properties, and aspects of the present disclosure are the subject matter of the following description. Further embodiments are shown in the schematic figures. These are intended to provide a simple understanding of the disclosure.

DETAILED DISCLOSURE

In the figures, the same reference signs are used for identical or similar components although a repeated description is omitted for reasons of simplicity.

Figure 1:
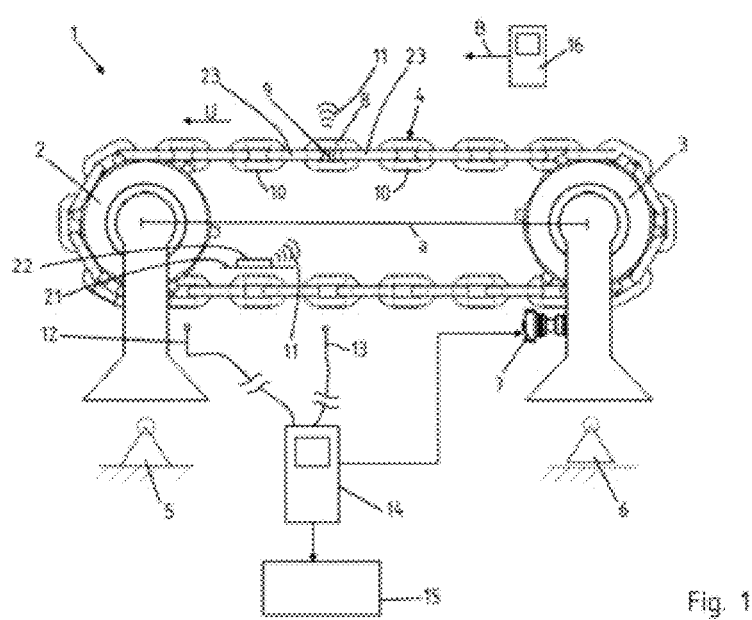
FIG. 1 shows a perspective illustration of the chain conveyor according to at least one embodiment of the disclosure.
Figure 2:
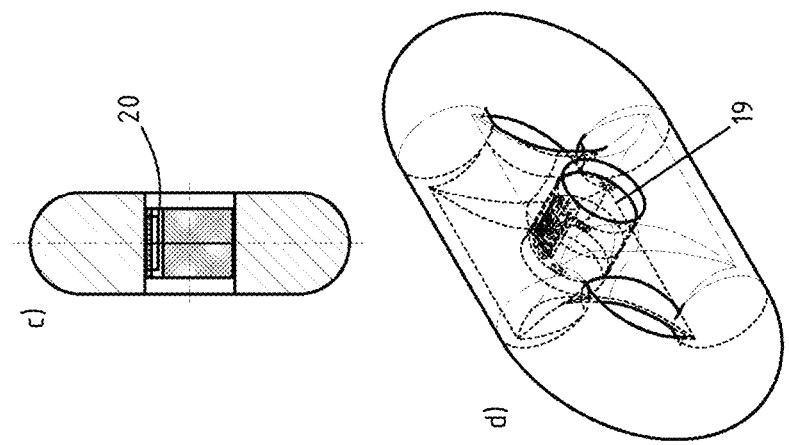
FIGS. 2A-2D show perspective views of the stationary chain link according to at least one embodiment of the disclosure.
Figure 2:
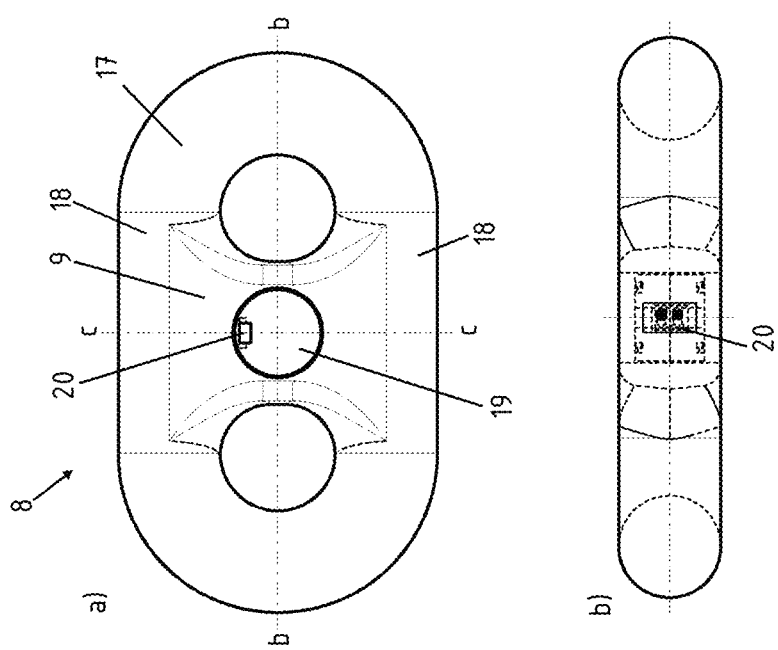

FIG. 1 shows a chain conveyor 1. This has a left-hand chain wheel 2 and a right-hand chain wheel 3. In between them is a chain strand 4 which circulates in the circulation direction U. For example, the left-hand chain wheel 2 is able to be arranged with a fixed bearing 5 and the right-hand chain wheel 3 with a floating bearing 6, so that the pretension set in a circulating chain strand 4 is adjusted by varying the distance a between the two chain wheels 2, 3 using a pre-tensioning device 7. The chain strand 4 then contains at least one chain link 8 with a crosspiece 9 located in the chain link 8. The chain link 8 is designed as a stationary chain link 8. On the left and right sides of the chain link 8, horizontal chain links 23 are then arranged. Overall, this results in a three-link chain strand. The chain links 23, which are each horizontal, are then coupled to the chain strand 4 via chain locks 10.

The chain strand 4 is able to be attached to driving pins or similar, not shown in detail, so that the chain conveyor 1 performs its corresponding conveying function, which for simplification purposes is not shown. The upper part of the chain strand 4 is able to run in a channel or in an upper run. The lower part of the chain strand 4 is able to run in a lower run. However, for simplification purposes, this is also not shown.

According to the disclosure, a measurement module is able to be arranged in the stationary chain link, in the crosspiece 9 of the stationary chain link 8. This measurement module is able to collect data on demand and transmit it wirelessly. In order that the measurement module does not transmit permanently and thus any energy storage unit that is able to be present in the measurement module would be discharged relatively quickly, it is provided that when the measurement module passes over a first antenna 12, the measurement module is woken from a standby mode, for example, a deep sleep mode. A recording of the chain forces present in the chain strand 4 is then carried out, for a specified period of time. A second antenna 13 following later in the circulation direction U is able to receive the recorded measured values as data as the antenna is passed, and forward the data to a communication device 14, which is a stationary communication device 14, for example. It would also be possible for the measurement module to fall back into the deep sleep mode after passing the second antenna 13, for example by means of a deactivation signal. For example, the second antenna 13 is able to emit a deactivation signal for this purpose. In this case, the activation of the measurement module would not last for a specified period of time, but only until the second antenna 13 is passed.

It is then possible to forward the recorded measured values to a downstream control center 15, for example, via the communication device 14. It is also possible that the measured values are conditioned, evaluated and/or processed and, for example, forwarded as a direct feedback variable to the pre-tensioning device 7, so that as a control loop the pre-tension is adjusted continuously during operation, but on the basis of the periodically measured forces. Two or more measurement modules, not shown in detail, are able to be arranged in the length of the chain strand 4. The distance a between the two chain wheels 2, 3 is able to be up to several 100 meters. The distance between the first and the second antenna 12, 13 is able to be several meters. The transmission of the data to the second antenna 13 takes place with a small transmission range of the measurement module. This is associated with low energy consumption. Therefore, it is recommended that after recording, the data is only transmitted to the second antenna 12, for example, and that it is not transmitted continuously by the first antenna 12 immediately after activation.

Also shown is a mobile communication device 16. On the one hand, this mobile communication device 16 is able to be used to influence the measurement modules individually, for example, to set a mode in the measurement module, independently of the position of the chain link 4. However, the mobile communication device 16 is able to be transported in the direction of motion B parallel to the measurement module in order to record data from the measurement device, either according to demand or on a random sample basis, when the chain strand 4 is in operation.

Furthermore, in FIG. 1 a repeater 22 is arranged on a frame 21. For example, the frame 21 is able to be directly integrated into a channel, not shown in detail, in which the chain strand runs. The repeater 22 is able to receive data from the measurement module 20 when it is passed by the measurement module 20. The repeater 22 is able to be placed spatially very close to the chain strand 4 that is moved past it, so that the transmission power from the measurement module to the repeater 22 is low. The repeater 22 itself then transmits the data in turn to a designated receiver, for example to the second antenna 13. The repeater 22 is positioned at the side of a channel that is not shown in detail. In this case, locally directed wireless transmission of the data from the repeater 22 is possible, this is able to be mounted in such a way that it would not be shielded by the channel or a lower run.

FIGS. 2A-2D show a stationary chain link 8 according to the disclosure. The chain link 8 is able to be designed, for example, for a rounded steel link chain. The legs 18 then extend between the two rounded sections 17, wherein a vertical crosspiece 9 is formed between the legs 18. A mounting opening 19 is present in the crosspiece 9 itself, with a measurement module 20 being arranged in the mounting opening 19. The mounting opening 19 is able to be closed, for example, by means of a potting resin. The measurement module 20 comprises at least one strain gauge, a transmission unit, and an energy storage unit.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A method of pre-tensioning a chain conveyor, the method comprising:
    deflecting a chain strand on the chain conveyor, wherein the deflecting is performed using a chain wheel on the chain conveyor;
    collecting data using a measurement model integrated into the chain strand;
    transmitting the collected data wirelessly to a communication device outside the chain strand;
    adjusting a pre-tensioning force according to the transmitted data using the measurement module;
    wirelessly transmitting values of a strain gauge of the measurement module to the communication device;
    activating a deep sleep mode of the measurement module using an activation signal into a recording mode or measurement mode; and
    deactivating the recording mode after the activation signal has terminated, and the measurement module returns to the deep sleep mode.

2. The method according to claim 1, wherein the collecting of the data is performed periodically.

3. The method according to claim 1, further comprising activating the measurement module via radio.

4. The method according to claim 1, wherein the measuring of the activation signal is performed immediately after the chain strand has left the chain wheel.

5. The method according to claim 1, wherein the measuring is performed after each circuit of the chain strand around the measurement module.

6. The method according to claim 1, further comprising using the collected data to adjust the pre-tensioning force.

7. The method according to claim 1, further comprising sending the collected data from the measurement module to other receivers.

8. The method according to claim 1, further comprising:
    receiving the data from the measurement module using a repeater; and
    forwarding the data wirelessly to the communication device.

9. The method according to claim 1, further comprising measuring an amount of raw data using the measurement module, the measurement model comprising a conditioning device or filtering capability such that the amount of raw data is significantly reduced to a reduced amount of raw data, and forwarding the reduced amount of raw data from the measurement module to the communication module.

10. The method according to claim 1, further comprising deactivating the recording mode after a time window, and the measurement module returns to the deep sleep mode.

11. The method according to claim 1, further comprising deactivating the recording mode using a deactivation signal, and the measurement module returns to the deep sleep mode.

12. The method according to claim 1, further comprising using the collected data as a control variable to regulate the pre-tensioning force.

13. The method according to claim 1, wherein the transmitting of the collected data from the communication device to other receivers.

14. The method according to claim 1, wherein the collecting of the data is performed continuously.

15. The method according to claim 1, wherein the collecting of the data is performed on a demand-oriented basis.

* * * * *